Feb. 25, 1969   B. A. DI BENEDETTO ET AL   3,429,818
METHOD OF GROWING CRYSTALS
Filed Feb. 12, 1965

INVENTORS
ABRAHAM I. MLAVSKY
BERNARD A. DIBENEDETTO
BY
*Nicholas A. Pandiscio*
ATTORNEY

United States Patent Office 3,429,818
Patented Feb. 25, 1969

3,429,818
METHOD OF GROWING CRYSTALS
Bernard A. Di Benedetto, Waltham, and Abraham I. Mlavsky, Lexington, Mass., assignors to Tyco Laboratories, Inc., Waltham, Mass., a corporation of Massachusetts
Filed Feb. 12, 1965, Ser. No. 432,277
U.S. Cl. 252—62.9      14 Claims
Int. Cl. B01j 17/14; B01d 9/00

ABSTRACT OF THE DISCLOSURE

Method of growing a solid solution single crystal combining selected compounds involving passing a zone of matter solvent through a selected crystalline feed material by the process of dissolution and recrystallization under conditions such that the feed material which enters the solvent as solute recrystallizes out of the solvent onto a selected seed crystal in the form of a solid solution single crystal. The feed material has the same stoichiometry as the desired end product and the interface temperatures of the solvent zone (and thereby the composition of the solvent zone) are held constant during movement thereof so that the end product will have a uniform composition.

---

This invention relates to new and improved electronic materials and more particularly to a new method of preparing solid-solution single crystals of selected compounds.

The increasing interest in the electronic properties of crystalline materials has resulted in efforts to grow solid solution single crystals combining selected high purity compounds. An especially appealing aspect of such crystals is that they offer the advantage of optimizing or modifying the characteristics of the individual solid solution constituents. For example, the ferroelectric property of compounds like barium titanate, lead zirconate, etc. can be modified by growing such materials as constituents of solid-solution single crystals. For convenience, solid solutions may be represented schematically as $A_xB_{1-x}$ where A and B are the solid solution constituents and $x$ has a value of $0<x<1$. Prior attempts to prepare solid-solution crystals have often involved growing them from a melt containing the individual constituents. However, it is recognized that this melt technique is not satisfactory. Certain compounds cannot be grown from the melt because they decompose at high temperatures or because the receptacle for the melt cannot withstand the operating temperature or else contaminates the melt. Furthermore, the recrystallization rate of each component of a solid solution varies so that cooling a pot of melt results in non-uniform deposition stoichiometry. There also have been attempts to grow solid-solution crystals from solution; but these have been handicapped by the fact that the constituents have different solubilities in a flux and tend to segregate so that the crystallizing solid solution exhibits a continuous change in the relative proportions of the two constituents A and B.

Accordingly the primary object of this invention is to provide a method which substantially overcomes the foregoing problems and provides highly pure and stoichiometric single crystals of solid solution compositions.

A more specific object is to provide a new method of growing solid-solution crystals involving a seed crystal, a crystalline feed material of predetermined composition, and an intermediate solvent zone of predetermined composition which is caused to pass through the feed material by dissolving the latter and leaving a stoichiometric solid-solution crystal deposited on the seed crystal.

A further object is to provide a method of growing solid solution single crystals of ferroelectric compounds.

Other objects and many of the attendant advantages of the invention are believed to be readily apparent from the following specification and the accompanying drawings which disclose, by way of example and otherwise, the principles and best modes of the invention. The drawings are identified as follows.

The present invention involves crystal growth from solution by means of a new and improved form of the travelling solvent method (commonly identified by persons skilled in the art as "TSM"). This improved method offers the advantages that no crucible is required, operating temperature range is below the melting points of the constituent materials, the rate of crystal growth is not limited by amount of solubility (but only by rate of change of solubility with temperature), and the growth composition as well as the growth direction are controlled.

Figure 1:
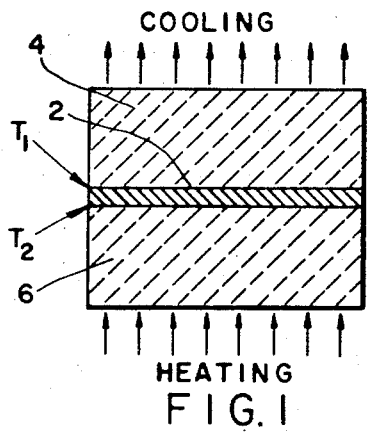
FIGS. 1 and 2 illustrate how crystal growth is achieved by solvent zone movement.
Figure 2:
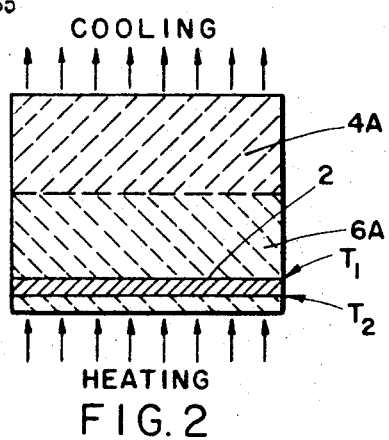

The principles of TSM as heretofore practiced are illustrated by FIGS. 1 and 2 wherein a thin layer of solvent 2 is disposed between two slices of crystalline material to form a so-called TSM sandwich. One slice 4 is the seed crystal on which crystal growth is to occur; the other slice 6 serves as the feed or source of the material that is to grow onto the seed. Heat is applied to the sandwich at a rate sufficient to melt the solvent and maintain it molten. Additionally the heat is applied from one direction so as to establish a temperature gradient across the solvent zone with a temperature $T_1$ at the interface of solvent 2 and slice 4 less than the temperature $T_2$ at the interface of the solvent and slice 6. The solvent in molten condition dissolves material at both interfaces until it is saturated. Because of the temperature dependence of solubility, the liquid zone becomes supersaturated at $T_2$ with respect to $T_1$. As a result material dissolving from the feed crystal at interface $T_2$ crosses the molten zone and recrystallizes out onto the seed crystal. With time, the flux zone moves through the feed material as shown in FIG. 2, leaving behind a continuous single crystal comprising in part the original seed material (designated 4A) and in part the original feed material (designated 6A).

We have determined that application of the principles of TSM to growth of solid solution crystals of predetermined deposition stoichiometry can be accomplished by:

(1) Using as the feed material a substantially uniform polycrystalline composition conforming stoichiometrically to the composition of the desired solid solution crystal, and (2) Maintaining the interface temperatures $T_2$ and $T_1$ substantially constant throughout the period that the solvent zone is passing through the feed material.

With the present invention use of a source material with the same stoichiometry as the desired end product is a necessary requirement since the solvent zone is relatively thin and substantially all of the feed material that enters the solvent as a solute recrystallizes out onto the seed material. A solid-solution crystal of uniform stoichiometry throughout a substantial portion thereof cannot result unless the composition of the solvent zone remains constant as it passes through the feed material. Given a feed material of homogeneous composition, maintaining the solvent zone composition fixed requires maintaining $T_2$ and $T_1$ constant. Otherwise, because they have different solubilities at different temperatures, the several constituents of the feed material will dissolve and recrystallize at different rates varying with $T_2$ and $T_1$. Heretofore, crystal growth by TSM has required merely that there be a temperature gradient across the sandwich sufficient to cause the molten solvent to pass through the feed material; the temperature limits of the gradient could vary substantially, e.g., 150 centigrade degrees, without affecting the stoichiometry of the crystal growth. This tolerance of temperature variation was permissive due to the fact that the end product constituted single compound crystals, e.g. silicon carbide, gallium arsenide, etc.

The temperature gradient across the solvent zone is a function of sandwich thickness, zone thickness, and the temperatures at the top and bottom faces of the sandwich. In practice, an over-all sandwich thickness of about 150 mils with a solvent zone of 2–4 mils is customary. When apparatus of the type hereinafter described is used to heat such sandwiches to typical operating temperatures, e.g. 1,000° C., a temperature gradient of at least 30–75 centigrade degrees is established across the sandwich. Thus as the solvent zone moves toward the heat source, its temperatures $T_2$ and $T_1$ both tend to increase to the level of the hotter face of the feed crystal. If this were allowed to occur, the over-all change in average solvent temperature would be sufficient to cause the deposited crystal to have a varying stoichiometry. The present invention involves maintaining $T_2$ and $T_1$ constant by reducing the heat input as the solvent zone moves through the feed crystal. Because the difference between $T_2$ and $T_1$ is generally quite small, usually in the range of .1 to 3 degrees, and since the solvent zone thickness does not vary, it is not necessary to monitor $T_2$ and $T_1$ directly; instead it is sufficient to monitor the average temperature of the solvent zone or the temperature differential across the sandwich. The desired result of constant $T_2$ and $T_1$ is effectively achieved by keeping constant the average temperature of the solvent zone.

The invention may be practiced according to either of two basic modes. In one mode the TSM sandwich consists of a seed crystal, a thin layer of solvent, and a polycrystalline feed material. Due to the unavailability of solid solution seed and feed material having the desired composition, the process is carried out using an A or B crystal as the seed and polycrystalline AB material as the feed. In the second mode the seed crystal may be a previously grown solid solution or one of the constituents of the desired solid solution crystal, and the solvent is preloaded with constituents of the polycrystalline material in proportions determined in a manner hereinafter described. The purpose and advantages of the second mode are believed to be more readily understood by first considering what occurs in the practice of the first mode. In both modes the selection of the desired solid solution composition is arbitrary.

In the first mode the constituents A and B are not present initially in the solvent. However, at the proper temperature each constituent begins to dissolve into the solvent at the interface with the polycrystalline feed material. Since the two constituents A and B do not have the same solubility, the liquid zone does not become supersaturated at $T_2$ with respect to $T_1$ simultaneously for both constituents; hence, the initial deposition will not comprise A and B in the desired stoichiometry. However as steady state conditions are established, the deposition shifts to the correct stoichiometry. The result is a graded growth with A and B shifting in ratio to the correct stoichiometry. This is a desirable result where the seed crystal is one of the constituents of the solid solution since the graded growth helps reduce the strain at the growth interface resulting from lattice parameter differences. However, similar considerations require that this graded growth not occur when the seed crystal is a solid solution of the same constituents. The second mode of the invention makes this possible.

Figure 3:
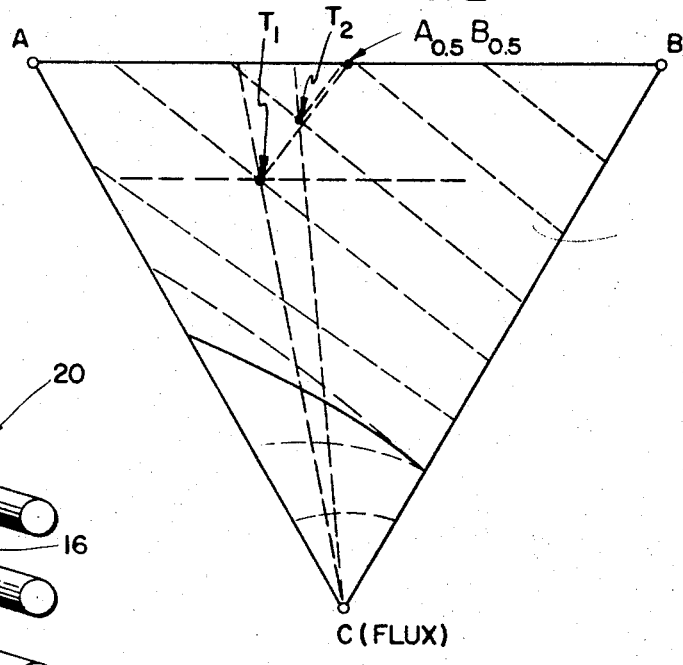
FIG. 3 is model ternary phase diagram.

For an explanation of the second mode of the invention, reference is had to FIG. 3 which is a ternary phase diagram of a model solid solution flux system involving constituents A and B and a flux C. A and B form a continuous series of solid solutions. They also form simple eutectics with the flux C. For the sake of discussion, let it be assumed that the problem is to grow a uniform mixed crystal represented as $A_{0.5}B_{0.5}$. First an operating temperature T is chosen which is convenient for crystal growth. Such a temperature is one at which the rate of growth is suitable, the volatilization of solvent is minimal, and a molten phase is present in the ternary system ABC. From the phase diagram, the point on the liquidus at temperature T is found at which the liquid at that temperature is in equilibrium with the solid of the composition to be grown, namely, $A_{0.5}B_{0.5}$. This liquid is of such composition that if it is cooled down, the initial deposition of solid has the composition $A_{0.5}B_{0.5}$. From the nature of these ternary systems it is known that in the vicinity of this selected temperature-composition point, there is a plurality of other temperature-composition points which also will yield an initial deposition of the solid $A_{0.5}B_{0.5}$. It also is known that under the normal conditions of TSM crystal growth, a certain temperature difference will occur across a solvent zone of a certain thickness, with one interface higher than the other. Accordingly the average zone temperature can be chosen such that one interface temperature is slightly above T and the other is slightly below T. For each of these temperatures (which correspond respectively to the temperatures $T_2$ and $T_1$ previously described), there is a liquid composition which is in equilibrium with solid $A_{0.5}B_{0.5}$. Accordingly, if now a temperature gradient is established across a sandwich such that the seed interface temperature is $T_1$ and the feed interface temperature is $T_2$, and if in this sandwich the solvent zone initially has a composition corresponding to the average of the equilibrium liquid compositions at $T_2$ and $T_1$ while the feed material has the composition $A_{0.5}B_{0.5}$, the solid crystallizing out on the seed crystal will have the desired composition $A_{0.5}B_{0.5}$ so long as the temperatures $T_2$ and $T_1$ are maintained constant. Under such operating conditions the solvent zone will be in equilibrium at one interface with $A_{0.5}B_{0.5}$ at $T_2$ and will be in equilibrium at the other interface with $A_{0.5}B_{0.5}$ at $T_1$. While the crystallizing solid has the same composition as the feed material, it differs in that it is in the form of a single crystal so long as the initial seed is monocrystalline. It is to be appreciated that because the solvent zone is relatively thin, the diffusion path for the constituents A and B is very short. As a consequence, steady state conditions occur rapidly at both interfaces. Certain other things are to be noted about the solvent zone in such a system. First of all, by virtue of the temperature dependence of solubility, there is a difference in total amount of A and B in solution across the zone. Secondly, there is a gradient in the A:B ratio across the zone. Thirdly the ratio of A:B required for maintaining equilibrium in the solvent zone is substantially different from the $A_{0.5}B_{0.5}$ solid material.

With this second mode of the invention, the initial deposition conforms substantially to the desired stoichiometry so that little or no graded growth is apparent in the bulk of the grown solid solution crystal starting at the growth interface with the seed crystal. Of course the seed crystal need not be a solid solution in order to practice this second mode of the invention.

It is to be understood that the phase diagram of FIG. 3 represents only a model ternary system and that in practice each specific system is characterized by its own phase diagram wherein the liquids compositions at different temperatures are developed from experimental data. With respect to formulating the solvent composition at the average zone temperature, $(T_1+T_2)/2$, the component C is determined first from the applicable ternary phase diagram. The other components A and B make up the difference in the proportions determined by reference to the AB side of the ternary phase diagram.

In practice of both modes of this invention it is essential that the A and B constituents be in uniform admixture in the feed material. It also is necessary that this feed material be substantially free of pores large enough to cause breakup of the solvent zone. Breakup of the solvent zone occurs when migration of solvent into pores of the feed material is sufficient to permit direct contact of the feed and seed materials. This is a serious drawback since it results in sintering of crystallites onto the seed rather than the desired regrowth. As a matter of practice it is preferred that the pore size not exceed $\frac{1}{10}$ the thickness of the solvent zone. Accordingly in the preferred practice of the invention the slice of polycrystalline feed material is obtained by providing A and B in fine particle form, mixing them into a uniform mixture, pressing them to obtain a dense slug, and then firing the slug to get solid state sintering and diffusion. The result is a dense, homogeneous polycrystalline feed material which is substantially free of pores large enough to cause breakup of the solvent zone.

In cases where the porosity cannot be reduced to a satisfactory level by compressing the constituents into a dense slug, it is possible to achieve the same result by presaturating the slug of feed material with solvent. One way is to mix powdered solvent material with the A and B constituents before pressing and sintering them. The second and preferred approach is to form the slug, subject it to heating in a vaccum to drive off gases from its pores, and immerse it in molten flux while under said vacuum, thereby filling the pores with the flux.

Figure 4:
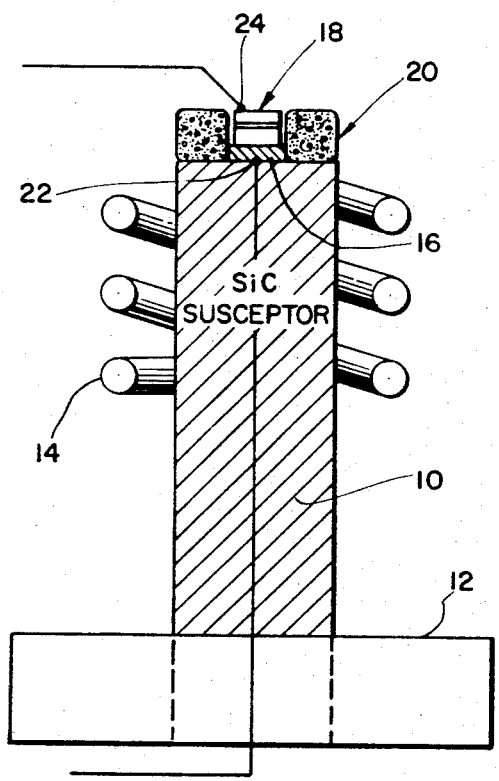
FIG. 4 illustrates one form of apparatus that may be employed to practice the invention.

Both modes of our process may be carried out with relatively simple heating equipment as, for example, the apparatus of FIG. 4. The illustrated heater comprises a vertically elongated silicon carbide susceptor 10 mounted on a suitable base 12 and surrounded by a water cooled RF coil 14 energized from an RF generator (not shown) whose output is variable up to a suitable maximum limit, e.g. six kilowatts. Mounted on and directly contacting the SiC susceptor is platinum setter 16 on which the TSM sandwich 18 is placed. Preferably cooling of the top face of the sandwich occurs by radiation to and convection of the surrounding air; however, external cooling devices may be employed if desired. $ZrO_2$ insulation 20 is disposed about the platinum setter and sandwich to inhibit cooling in a radial direction and thereby insure a flat zone. The entire apparatus may be operated in an air atmosphere or in an enclosed vessel containing an inert atmosphere. The temperature of the platinum setter and the top face of the sandwich are measured by thermocouples 22 and 24. The temperature gradient across the solvent zone is a function of zone thickness and zone distance relative to platinum setter 16, as well as the gradient across the sandwich. Hence it is possible to maintain temperatures $T_2$ and $T_1$ substantially constant during zone movement by lowering the heat input as the solvent zone moves toward the susceptor. This is accomplished by periodically reducing the RF power output by manual control or by means of an electronic controller (also not shown) operating according to a predetermined program based on previously acquired data.

Preferably the invention is used to produce solid solution titanates. However, it is applicable to growth of solid-solution crystals involving a wide variety of constituents, including but not limited to compounds falling within the formula $XYO_3$ where X represents a member of the class consisting of Ba, Sr, Pb, and Ca, Y represents a member of the class consisting of Ti, Zr, Hf, and Sn, and O represents oxygen.

Example I illustrates a preferred embodiment of the first mode of the invention.

EXAMPLE I

A slug of feed material is prepared by mixing together $BaTiO_3$ and $SrTiO_3$ powders in a 7 to 3 molar ratio, compacting the mixture, and firing it to a temperature of about 1,400° C. Out of this prepared slug there is cut a disk measuring about 1 cm. in diameter and 1–2 mm. thick. Then flux conforming in composition to

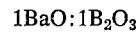
$$1BaO:1B_2O_3$$

is melted onto the disk in a layer measuring about 0.002" thick. Thereafter a seed disk of $BaTiO_3$ (comparable in size to the feed disk) is placed on top of the flux and the whole assembly is heated until the flux completely wets the seed disk and seals it to the feed disk to form a sandwich. Then the sandwich is placed on the platinum setter of the apparatus shown in FIG. 4 and the heating coil is energized to heat the bottom face of the sandwich to approximately 1,100 degrees centigrade. The apparatus is operated in an air atmosphere with no enclosed vessel. Because of cooling due to the radiation and convention, the top face of the sandwich assumes a temperature of about 1,050 degrees centigrade, giving a temperature gradient across the solvent zone of about .1 centigrade degree to 3 centigrade degrees. The temperatures of the top face of the sandwich and the platinum setter, i.e. the bottom face of the sandwich, are continuously monitored and in accordance with their observed values, the power input of the coil is reduced at selected intervals so as to maintain the average temperature of the solvent zone (and thereby also the temperatures of the two solvent interfaces) substantially constant. The solvent progresses entirely through the feed slice in about five hours. On examination, the seed crystal is found to have a void-free deposition of a solid solution single crystal of $(Ba_{.7}Sr_{.3})TiO_3$, but the initial deposition is graded in composition as determined by a graded lattice parameter change.

Example II illustrates a preferred embodiment of the second mode of the invention.

EXAMPLE II

Powdered $BaTiO_3$ and $SrTiO_3$ are mixed together in a 1:1 molar ratio and from this mixture a slug is prepared by compacting and sintering in the manner of Example I. A disk about 1 cm. in diameter and 1–2 mm. thick is cut from the slug. Onto one side of this disk is melted a flux layer about 3 mils thick conforming in composition to $.7BaO/.3SrO:2B_2O_3$. Thereafter a seed disk of single crystal $BaTiO_3$ is placed on top of the solidified flux layer. The seed disk has approximately the same size and thickness as the feed disk. This assembly is reheated to a temperature of about 1,000° C. for a time sufficient to wet the seed disk with the flux. Thereafter the resulting sandwich is placed on the platinum setter of the apparatus of FIG. 1 with the seed side up. Initially the temperature of the top face of the sandwich is raised to about 1,050 centigrade degrees. Thereafter this temperature is decreased gradually during the run by a gradual lowering of coil power input. The temperature of the top face is at about 1,000° C. at the end of the run which occurs after about three hours. The power input is lowered at a rate which operates to maintain the average temperature of the solvent zone (and thus also $T_2$ and $T_1$) constant during the run. On completion of the run, the single crystal deposition on the seed crystal is found to conform to

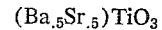
$$(Ba_{.5}Sr_{.5})TiO_3$$

with no apparent grading in composition. The presence of strain at the growth interface results from lattice parameter differences and can be avoided by using a solid solution seed crystal of the same composition produced by a previous run.

Other specific examples of the invention on the same scale (i.e., same sizes and thicknesses of feed and seed disks and solvent layer) and using the techniques and apparatus described above are as follows: (1)

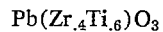
$$Pb(Zr_{.4}Ti_{.6})O_3$$

single crystals may be grown at average solvent zone temperatures in the range of 1,100–1,150° C. on a single crystal seed of $PbTiO_3$ using a polycrystalline feed conforming to $Pb(Zr_{.4}Ti_{.6})O_3$ and a flux consisting of PbO:B$_2$O$_3$; (2) Pb(Zr$_{.5}$Ti$_{.5}$)O$_3$ may be grown on a single crystal of PbTiO$_3$ using a feed material of the same stoichiometry and a flux consisting of 60% Pb(Ti$_{.6}$Zr$_{.4}$)O$_3$ and 40% PbO:B$_2$O$_3$ at an average solvent temperature of 1,100° C.; (3) crystals of (Ba$_{.5}$Sr$_{.5}$)TiO$_3$ may be grown on single crystals of BaTiO$_3$ using a flux consisting of 80% (Ba$_{.3}$Sr$_{.7}$)TiO$_3$ and 20% B$_2$O$_3$ at an average solvent temperature of about 1,150° C.; (4) crystals of $$Y_3(Fe_xAl_{5-x})O_{12}$$

can be deposited on single crystals of YFe$_5$O$_{12}$ using 15% [Y$_3$(Fe$_y$Al$_{5-y}$)O$_{12}$] and 85% 2BaO:1B$_2$O$_3$ at 1,150° C. where $y > x$; and (5) crystals of Ga(As$_x$P$_{1-x}$) can be deposited on single crystals of GaAs using a flux of 50% Ga(As$_y$P$_{1-y}$) and 50% Ga at an average solvent temperature of about 900° C. (where $y > x$).

The foregoing examples are only illustrative, it being understood that various other solid-solution crystals may be grown on the same or different seed crystals. Similarly, the invention is applicable to and may be practiced with many different solvents in addition to those previously noted, provided, however, that these solvents are capable of dissolving the feed and the seed materials and do so at temperatures below the melting points of such materials. Additionally the solvent must not volatilize at the growth temperature and the solubility of the solid solution constituents A and B in the solvent must be temperature dependent. The flux also should not exhibit any appreciable tendency to appear as a solid solution in the grown crystal.

Accordingly it is to be understood that the invention is not limited in its application to the specific details described or illustrated herein, and that within the scope of the appended claims, it may be practiced otherwise than as specifically described or illustrated.

We claim:

1. A method of preparing homogeneous solid solution single crystals of A$_x$B$_{1-x}$ where A and B are compounds and $x$ has the value of $0 < x < 1$; comprising initially preparing a sandwich consisting of an outer feed layer comprising A and B in uniform admixture, an outer seed layer consisting of at least one of said A and B compounds, and an inner flux layer consisting of said A and B compounds and a solvent for said compounds in predetermined proportions; heating said sandwich to a temperature below the melting point of said composition A$_x$B$_{1-x}$ at which said flux layer melts and providing a temperature gradient across said inner layer so that its interface with said seed layer is at a first temperature T$_1$ and its interface with said feed layer is at a slightly higher temperature T$_2$; and maintaining said interface temperatures substantially constant as said flux layer moves through said sandwich by dissolving said feed layer at said temperature T$_2$ and depositing it onto said seed layer at said temperature T$_1$.

2. A method as defined by claim 1 wherein A and B are titanates and said solvent is a borate.

3. The method of claim 1 wherein A and B are gallium arsenide and gallium phosphide and the solvent is gallium.

4. The method of claim 1 wherein said feed layer is obtained from a compacted and sintered slug produced from a mixture of A and B in powdered form and is substantially free of surface voids.

5. A method of preparing solid solution single crystals of A$_x$B$_{1-x}$ where A and B are compounds and $x$ has the value of $0 < x < 1$ comprising, initially preparing a sandwich having a first outer layer consisting of a single crystal seed material consisting of at least one of said A and B compounds, a second outer layer consisting of a crystalline feed material comprising A and B in the molar ratio of $x$ to $1-x$, and a third inner flux layer consisting of a solvent for said A and B compounds and A and B in the proportions characteristic of the liquids in equilibrium with A$_x$B$_{1-x}$ at a temperature $(T_2+T_1)/2$ where both T$_2$ and T$_1$ are sufficiently above the melting point of said solvent to yield liquid compositions of said solvent and A and B in equilibrium with A$_x$B$_{1-x}$; heating said sandwich to melt said flux layer and establishing a temperature gradient across said flux layer so that its interface with said seed layer is at a temperature T$_1$ and its interface with said feed layer is at a higher temperature T$_2$; and maintaining said interface temperatures substantially constant whereby said flux layer will move through said feed layer by the process of dissolution and a solid solution single crystal of composition A$_x$B$_{1-x}$ will be deposited onto said seed layer by the process of recrystallization.

6. The method of claim 5 wherein said interface temperatures are held substantially constant by reducing the rate of heating as the flux layer migrates through the feed layer.

7. A method of preparing a homogeneous solid solution single crystal of composition (Ba$_x$Sr$_{1-x}$)TiO$_3$ where the value of $x$ is $0 < x < 1$ comprising mixing together in powdered form the compounds BaTiO$_3$ and SrTiO$_3$ in the ratio of $x$ to $1-x$ to achieve a uniform mixture, compacting said mixture, and firing said mixture to obtain a dense homogeneous feed material; preparing a sandwich consisting of an outer layer of said feed material, an outer single crystal seed layer consisting of at least one of said compounds, and an inner flux layer consisting of $$BaO:B_2O_3$$

heating said sandwich to a temperature below the melting point of said composition (Ba$_x$Sr$_{1-x}$)TiO$_3$ at which said flux layer is molten; providing a temperature gradient across said molten flux layer so that its interface with said seed layer is at a first temperature T$_1$ and its interface with said layer of feed material is at a second higher temperature T$_2$; and maintaining said interface temperatures substantially constant as said flux layer moves through said sandwich by dissolving said layer of feed material on one said and depositing a solid solution single crystal onto said seed layer on the opposite side.

8. A method of preparing a homogeneous solid solution single crystal of composition Pb(Zr$_x$Ti$_{1-x}$)O$_3$ where the value of $x$ is $0 < x < 1$ comprising mixing together in powdered form the compounds PbZrO$_3$ and PbTiO$_3$ in the ratio of $x$ to $1-x$ to achieve a uniform mixture, compacting said mixture, and firing said mixture to obtain a dense homogeneous feed material; preparing a sandwich consisting of an outer layer of said feed material, an outer single crystal seed layer consisting of at least one of said compounds, and an inner flux layer consisting of $$PbO:B_2O_3$$

heating said sandwich to a temperature below the melting point of said composition Pb(Zr$_x$Ti$_{1-x}$)O$_3$ at which said flux layer is molten; providing a temperature gradient across said molten flux layer so that its interface with said seed layer is at a first temperature T$_1$ and its interface with said layer of feed material is at a second higher temperature T$_2$; and maintaining said interface temperatures substantially constant as said flux layer moves through said sandwich by dissolving said layer of feed material on one side and depositing a solid solution single crystal onto said seed layer on the opposite side.

9. A method of preparing a homogeneous solid solution single crystal of composition Ga(As$_x$P$_{1-x}$) where the value of $x$ is $0 < x < 1$ comprising mixing together in powdered form the compounds gallium arsenide and gallium phosphide in the ratio of $x$ to $1-x$ to achieve a uniform mixture, compacting said mixture, and firing said mixture to obtain a dense homogeneous feed material; preparing a sandwich consisting of an outer layer of said feed material, an outer single crystal seed layer consisting of at least one of said compounds, and an inner flux layer consisting of gallium; heating said sandwich to a temperature below the melting point of said composition Ga(As$_x$P$_{1-x}$) at which said flux layer is molten; providing a temperature gradient across said molten flux layer so that its interface with said seed layer is at a first temperature T$_1$ and its interface with said layer of feed material is at a second higher temperature T$_2$; and maintaining said interface temperatures substantially constant as said flux layer moves through said sandwich by dissolving said layer of feed material on one side and depositing a solid solution single crystal onto said seed layer on the opposite side.

10. A method of preparing a homogeneous solid solution single crystal of composition $Y_3(Fe_xAl_{5-x})O_{12}$ where the value of $x$ is $0<x<1$ comprising mixing together the compounds yttrium iron oxide and yttrium aluminum oxide in the ratio of $x$ to $1-x$ to achieve a uniform mixture, compacting said mixture, and firing said mixture to obtain a dense homogeneous feed material; preparing a sandwich consisting of an outer layer of said feed material, an outer single crystal seed layer consisting of at least one of said compounds, and an inner flux layer consisting of $2BaO:1B_2O_3$; heating said sandwich to a temperature below the melting point of said composition $Y_3(Fe_xAl_{5-x})O_{12}$ at which said flux layer is molten; providing a temperature gradient across said molten flux layer so that its interface with said seed layer is at a first temperature $T_1$ and its interface with said layer of feed material is at a second higher temperature $T_2$; and maintaining said interface temperatures substantially constant as said flux layer moves through said sandwich by dissolving said layer of feed material on one side and depositing a solid solution single crystal onto said layer on the opposite side.

11. A method as defined by claim 1 wherein A is lead titanate and B is lead zirconate, and said flux comprises a mixture of lead titanate and lead zirconate together with $1PbO:1B_2O_3$.

12. A method as defined by claim 1 wherein A is an yttrium iron oxide and B is an yttrium aluminum oxide, and said solvent is $2BaO:1B_2O_3$.

13. A method as defined by claim 1 wherein A is barium titanate and B is strontium titanate.

14. A method as defined by claim 13 wherein said solvent consists of $B_2O_3$ alone or together with BaO.

References Cited

UNITED STATES PATENTS 3,205,101   9/1965   Mlavsky et al.
3,272,591   9/1966   Rudness et al. _____ 23—51

TOBIAS E. LEVOW, *Primary Examiner.*

R. D. EDMONDS, *Assistant Examiner.*

U.S. Cl. X.R.

252—62, 3, 62.57, 62.58; 106—39; 148—1.6; 23—301, 305, 51, 52, 53

UNITED STATES PATENT OFFICE
CERTIFICATE OF CORRECTION

Patent No. 3,429,818                                            February 25, 1969

Bernard A. Di Benedetto et al.

It is certified that error appears in the above identified patent and that said Letters Patent are hereby corrected as shown below:

Column 8, line 35, "said" should read -- side --.

Signed and sealed this 31st day of March 1970.

(SEAL)
Attest:

Edward M. Fletcher, Jr.                                   WILLIAM E. SCHUYLER, JR.
Attesting Officer                                                    Commissioner of Patents